United States Patent [19]
Aragon

[11] Patent Number: 5,276,741
[45] Date of Patent: Jan. 4, 1994

[54] FUZZY STRING MATCHER

[75] Inventor: David B. Aragon, Berkeley, Calif.

[73] Assignee: TRW Financial Systems & Services, Inc., Cleveland, Ohio

[21] Appl. No.: 701,383

[22] Filed: May 16, 1991

[51] Int. Cl.⁵ ................................................ G06F 9/72
[52] U.S. Cl. ..................................... 382/40; 382/14; 395/61; 395/63
[58] Field of Search ................ 382/40, 14, 15, 57; 364/518; 395/61, 63; G06K 9/72

[56] References Cited

U.S. PATENT DOCUMENTS

| | | | |
|---|---|---|---|
| 4,058,795 | 11/1977 | Balm | 382/40 |
| 4,328,561 | 5/1982 | Convis et al. | 382/40 |
| 4,418,423 | 11/1983 | Tsuji et al. | 382/40 |
| 4,654,875 | 3/1987 | Srihari et al. | 382/40 |
| 4,979,227 | 12/1990 | Mittelbach et al. | 382/14 |
| 5,062,143 | 10/1991 | Schmitt | 382/40 |

FOREIGN PATENT DOCUMENTS

| | | |
|---|---|---|
| 0031493 | 7/1981 | European Pat. Off. |
| 1602591 | 11/1981 | United Kingdom |

OTHER PUBLICATIONS

Tucker/Deaton, libsell, TRW, 1989, manual pages.
"A Comparison of Some Novel and Traditional Lexical Distance Metrics for Spelling Correction"; K. Kukich; pp. 309–313; Jul. 1990.
"A Very Fast Associative Method for the Recognition and Correction of Misspelt Words, Based on Redundant Hash Addressing"; T. Kohonen et al.; pp. 807–809; Nov. 1978.
European Search Report, 2 pp.; mailed Apr. 15, 1993.
Levenshtein, Binary Codes Capable of Correction Insertions, Deletions and Reverals, Sov. Phys. Dockl., vol. 10, Feb. 1966.
Kohonen, Self-Organizational and Assocative Memory, Springer-Verlag, 2nd ed., 1988.
Young/Fu, Handbook of Pattern Recognition and Image Processing, Academic Press, 1986.
Haines/Hecht-Nielsen, A BAM w/Increased Information Storage Capacity, ICNN Pro., Jul. 1988, vol. I, pp. 181–190.
Kukich, Variations on Back-Propagation Name Recognition Net, Proc. USPS Adv. Tech. Conf., 1988, pp. 722–735.
Cherassky/Vassilas, Performance of Back Propagation Networks for Assoc. Database Retrieval, Proc. IJCNN-89, vol. II, Jun. 1989.
Lampinen/Oja, Fast Self-Organization by Probing Algorithm, Proc. of IJCNN-89, Jun. 1989, vol. 4.
Bradburn, review of Lampinen/Oja in Neural Network Review, vol. 4, 1990.
Kohonen, Self-Organizing Map, Proceedings of IEEE, vol. 78, No. 9, Sep. 1990.
Venta/Kohonen, Content-Addressable Software Method for Emulation of Neural Networks, Proc. of ICNN, Jul. 1988.

*Primary Examiner*—Michael T. Razavi
*Assistant Examiner*—Yon J. Conso
*Attorney, Agent, or Firm*—Sheldon & Mak

[57] ABSTRACT

An apparatus and method useful in correcting character strings misread by a character recognition engine. The misread string is compared to character strings contained in a lexicon of valid character strings and the similarity between the strings measured. The valid strings can be ranked by degree of similarity should further selection be required to determine the appropriate value of the misread character string.

48 Claims, 8 Drawing Sheets

FUZZY STRING MATCHER

BACKGROUND OF THE INVENTION

Computer system errors generally fall into three principal categories: central processing errors; peripheral device errors; and programming errors. One type of peripheral device error occurs when one item in a string of data is misread or incompletely read by a character recognition device. For example, character recognition engines are frequently employed to read large strings of alphabetical information such as printed addresses. The character recognition engine can occasionally misread or omit a character contained in the address string. This invention relates to error correction in character recognition systems and in particular to an apparatus and technique for resolving the error by matching the misread character string to similar character strings contained in a lexicon of valid character strings.

Existing hardware and software is unsuitable for resolving, quickly and with a minimal amount of storage space, the type of error described above. Known techniques provide a compromise between search speed and the amount of available operative data. In addition, certain of these known techniques are unsuitable for resolving the type of random error made by a character recognition engine since the known technique assumes the error has certain predefined characteristics.

One existing hardware device is the Fuzzy Set Comparator (FSC) chip manufactured by MicroDevices of 7725 N. Orange Blossom Trail, Orlando, Fla. The FSC chip compares up to eight patterns stored in a random access memory against one input and selects the closest match of the eight. All eight patterns are processed simultaneously and the closeness of each match is not reported. Expansion to 256 stored patterns is possible by adding additional memory hardware. A reference lexicon such as a ZIP code lexicon may contain hundreds or thousands of street names. The FSC chip is thus unsuitable for resolving problems similar to the misread of a character contained in a character string described in paragraph 1, since the lexicon size is severely limited by the hardware limit of 256 entries. Furthermore, the random access memory must be reloaded and rewritten whenever a new lexicon is referenced. This type of device is therefore useful only with a single, relatively small size lexicon.

Other correction devices have similar hardware limitations or assume the errors made have certain likely characteristics. For example, spelling correction algorithms rely on known valid relationships between the characters. Other correction hardware such as the Fast Data Finder manufactured by TRW of Cleveland, Ohio, contains a series of state machine logic which selects partial matches according to predefined criteria. Similarly, neural networks are general-purpose classifiers that precondition the input data so that important properties of the data are represented within the network. In addition, neural network structures require vast amounts of computation and storage to process data and perform the necessary comparisons. These types of error correction systems, because they rely on known or predefined properties of the input, do not address the random errors, independent of position or surrounding characters, likely to be made by a character recognition engine.

SUMMARY OF THE INVENTION

The present invention provides a system and method for correcting the random errors in character strings caused by failures in the character recognition system with a maximum of speed and a minimum amount of hardware. In particular the present invention provides an error correction device system and method which searches through a selected one of a multiple of available lexicons to locate valid character strings having the smallest holographic distance from the misread character string. The search method is independent of assumptions about the type of error and is therefore uniquely suited to addressing the problem of random errors made by character recognition engines.

According to one embodiment of the invention, the misread character string is subdivided into sets of N adjacent characters or N-grams. The frequency with which each of the N sets of adjacent characters occurs in the misread string is stored in a first N-gram count array. The first of the valid character strings is then also subdivided into N-grams. The frequency with which each N-gram occurs in the valid character string is entered into a second N-gram count array. As each update is made to the second array, a corresponding update is made to the difference in frequencies between the two arrays. The sum of the differences in frequencies determines the holographic distance between the misread string and the first valid character string. This process can be repeated for each of the valid character strings contained a lexicon of valid character strings.

The present invention therefore not only computes the holographic distance for each item in the lexicon as it is processed, but also updates the distance metric as the corresponding count array is incremented. This pipelined processing scheme avoids the need to read in an entire block of data and process that entire block before continuing operations and enhances operating speed.

According to an additional feature of the present invention, a best matching logic circuit can then select those valid character strings having the closest holographic distance to the misread string.

According to yet another feature of the present invention, a Manhattan or Eudlidean distance metric may be used to compare the two character strings.

According to still another feature of the present invention, the N-gram count arrays contain elements of varying width. Common N-grams are mapped to storage elements of wider widths while less common N-grams are mapped to storage elements of smaller widths. This count array structure further reduces the hardware and storage costs.

According to yet another feature of the present invention N-grams of different degrees may be processed simultaneously using multiple hashing logic, count arrays and difference update logic, and the distance computations combined to obtain a total holographic distance measurement.

DETAILED DESCRIPTION OF THE PREFERRED EMBODIMENT

For purposes of illustrating the principles and structure of the present invention, a specific application example will be considered throughout this document. In particular, the example will illustrate the correction of street names misread from U.S. Mail by imperfect character recognition engines.

Operational Theory and Overview

Character recognition engines typically distort names by misreading, omitting or inserting characters. The errors are generally independent of the character position within the name. A misread character string can be corrected by comparing the misread string to a series of valid character strings stored in a lexicon and computing a holographic distance to define how close each lexicon character string is to the improperly read string. In the operational example, the most probable correct street name can be identified by selecting the valid character string having the smallest holographic distance from the misread character string.

Figure 1:
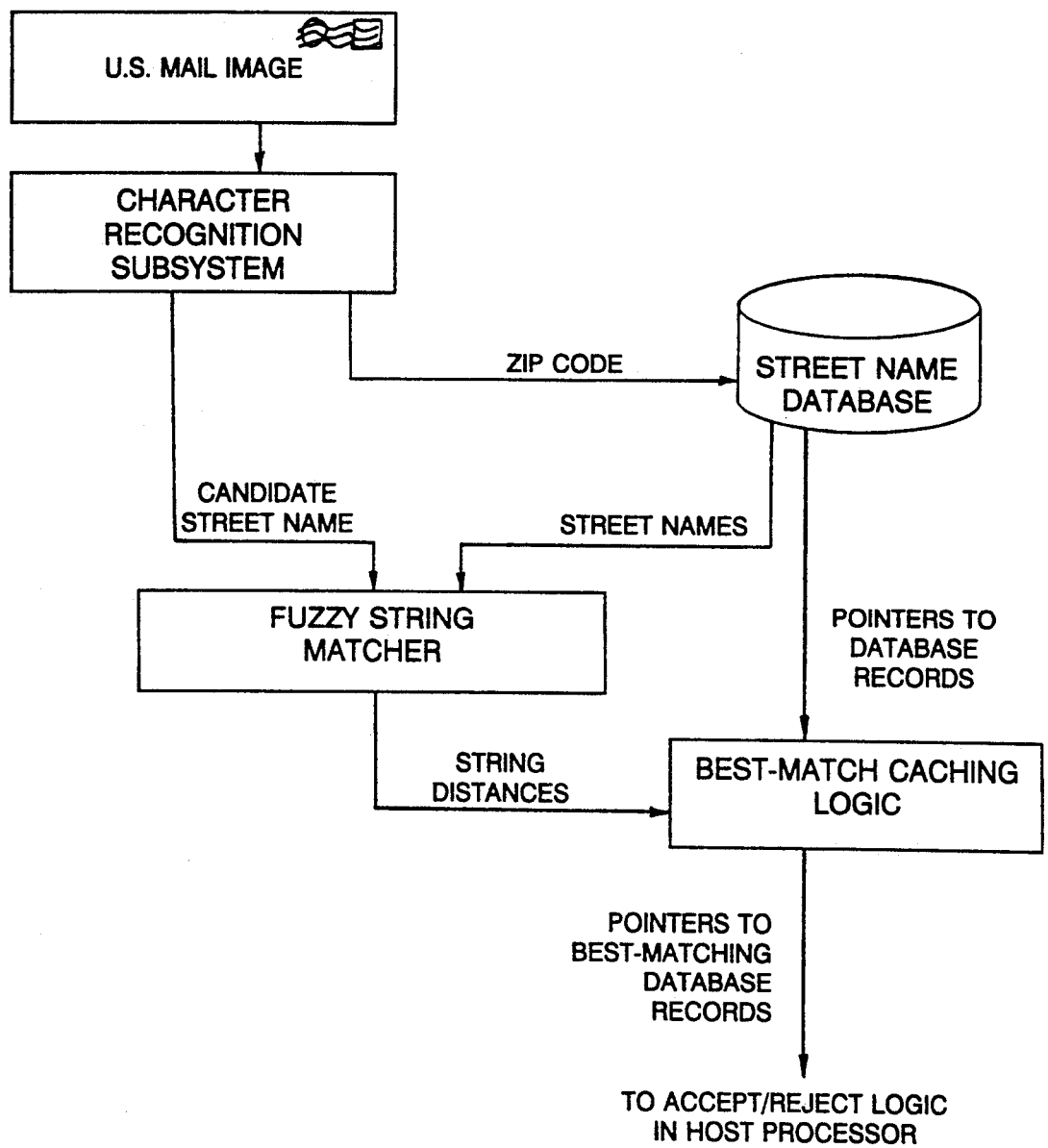
FIG. 1 is a block diagram of an example error correction system according to an embodiment of the present invention.

FIG. 1 diagrams the solution of the example problem using an embodiment of the present invention. A street name located on mail item 1 is misread by character recognition engine 2. The misread street name can be corrected by comparing the misread character string to a list of valid character strings located in a street name lexicon 3 which is organized by ZIP code or destination city. A fuzzy string matcher 4 compares the strings and computes the holographic distance for each pair. The correct street name can be selected from among the valid strings having the closest holographic distance to the misread string using best match logic 5.

Holographic distance may be computed using a variety of techniques, but preferably, the holographic distance measurements obey the following conventions:

(1) Two copies of the same string exhibit a distance of zero;

(2) Distance is greatest between strings that have few characters in common, or that have similar characters in very different order;

(3) Deletion, insertion or substitution of a single character causes only a small increase in distance; and (4) The position of a nonmatching character within the string has little or no effect on the distance.

One suitable holographic distance metric uses N-gram hashing techniques. A set of N adjacent letters in a string is called an N-gram. N-gram hashing counts the occurrences of each N-gram in an input string. Common values for N are 2 or 3, leading to bigram or trigram hashing, respectively. The hash function creates a vector of $A^N$ elements, where A is the alphabet size. Each element corresponds to an N-gram and is set to the number of times, or frequency, that N-gram occurs in the string.

String boundaries may be handled in various ways. For example, the initial letter could be regarded as part of an N-gram consisting of (N−1) blanks or nulls followed by the letter. The end of a string might be signaled either by an explicit control signal or by a null in the incoming data. Characters not in the intended set (e.g., not alphabetic) are regarded as confusion characters.

Figure 2:
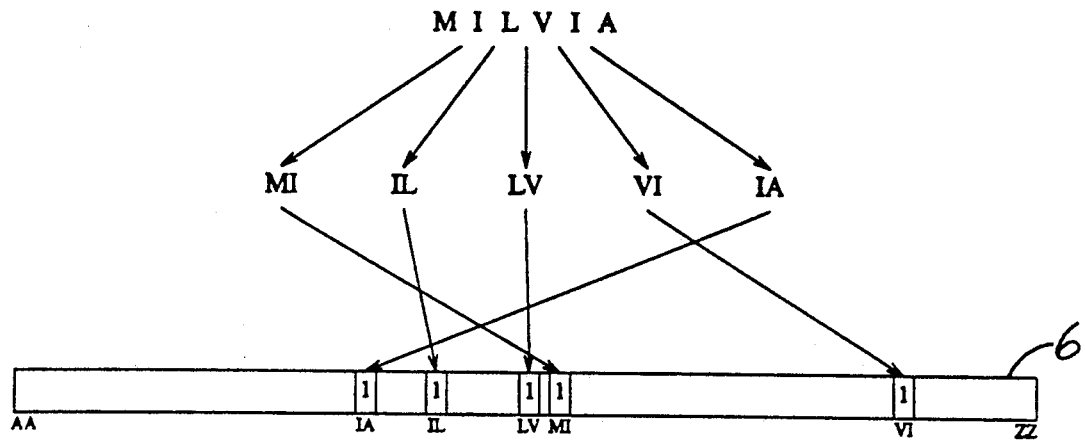
FIG. 2 is an illustrative example of bigram hashing and bigram count arrays for two character strings according to an embodiment of the present invention.

On lines 6 and 7 of FIG. 2 two example strings are represented in bigram-hashed form. Lines 6 and 7 are the vectors of $A^N$ elements, also called bigram count arrays. Each element of the array contains the number of occurrences of each bigram in the string.

The holographic distance between two strings is calculated by summing the differences between all corresponding bigram counts. For example, the string "windy" has an occurrence of the bigram WI while the string "?andy" does not. This difference in bigram count increases the holographic distance between the strings. Summing the absolute values of the differences for all bigrams results in a Manhattan distance measurement between the strings. Alternatively, the count differences can be squared before summing, to yield a squared Euclidean distance measurement. The squared Euclidean distance appears to give better results in applications similar to the postal service example.

Figure 3:
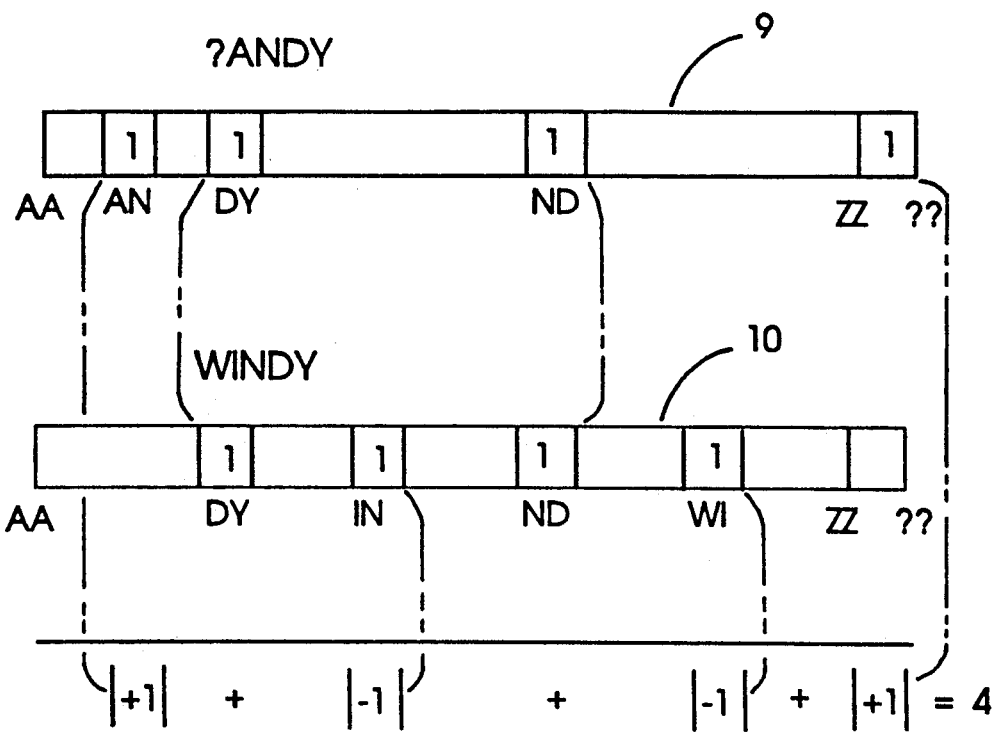
FIG. 3 is an example of the computation of holographic distance according to an embodiment of the present invention.

FIG. 3 illustrates the computation of holographic distance. In FIG. 3, the first letter of the character string "Sandy" has been misread by the character reader as "?andy." The character "?" is not in the intended alphabet and is treated as a confusion character. Lines 8 and 9 of FIG. 3 contain the bigram hashed values for the "?andy" data item. Line 10 contains the bigram hashed value for a valid data item, "windy" contained in the lexicon. The holographic distance between the items "?andy" and "windy" may be computed by comparing the hashed values of the bigram array elements in each of the bigram count arrays. In the example given in FIG. 3, the Manhattan distance between "?andy" and "windy" is four.

Line 12 of FIG. 3 contains the bigram count array for the valid character string "sandy" read from the lexicon data base. The holographic distance between the strings "?andy" and "sandy" equals two as shown. Comparison of the holographic distance values determines that the lexicon string "sandy" has the smallest of the two holographic distances from the misread character string. The string "sandy" is therefore appropriately identified as the valid value for the misread character string.

The efficiency of the distance computations can be improved by avoiding element by element comparison of the bigram count arrays and employing sparse coding or pipelining techniques. Element by element computation of the holographic distance between two bigram count arrays is time consuming. The arrays in the postal example have on the order of 1000 elements. However, nearly all of the array elements are zero, and the number of non-zero array elements is small. Holographic distance can therefore be updated as each array update occurs, rather than filling the count array and then reading it all back to compute distance.

For example, suppose bigram count array A has already been loaded with a misread string and a new lexicon string is being read to update bigram count array B. The loading of a new string into bigram count array B means that the value in one element of array B will be incremented by one. If Euclidean string distances are used, the change this incrementation makes in the squared difference between A and B is calculated. The old value of the difference between the two elements $(B-A)^2$, is replaced by the new difference $((B+1)-A)^2$. The total string distance also includes contributions from other bigrams, but those contributions are all constant with respect to the current bigram count and can be omitted from the calculation. As shown below, the update can be accomplished without a squaring operation.

| | |
|---|---|
| Current Difference (before update): | B−A |
| New Difference (after update): | $(B + 1) − A = B − A + 1$ |
| Current Squared Difference: | $(B − A)^2$ |
| New Squared Difference: | $(B − A + 1)^2$ |
| Update to Difference: | $(B − A + 1)^2 − (B − A)^2 =$ <br> $(B^2 − 2AB + B^2 + 2B − 2A + 1) −$ <br> $(B^2 − 2AB + A^2) =$ <br> $2B − 2A + 1 =$ <br> $2(B − A) + 1$ |

The update to the squared Euclidean distance, when element B is incremented by 1, is thus $2(B−A)+1$. The update for Manhattan distance is considerably easier. The required update is $+1$ if the current B−A difference is positive, and $−1$ if B−A is negative.

Thus, as each bigram is detected and hashed, its effect on the string distance can be propagated through to the output. The processing cost is therefore proportional to the length of the input strings, rather than to the length of the hashed vectors being compared.

HARDWARE IMPLEMENTATION

Figure 4:
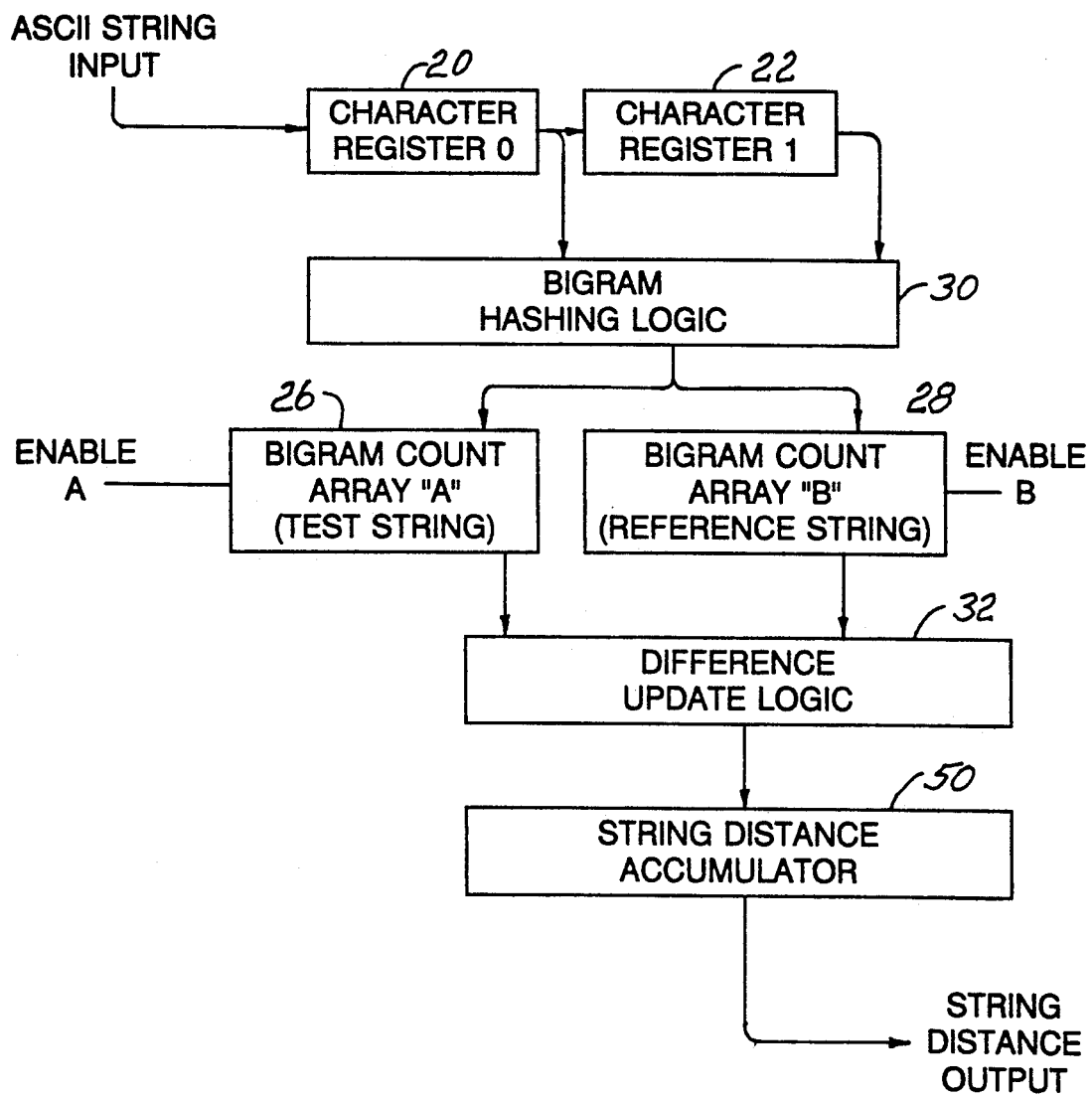
FIG. 4 is a functional block diagram of a fuzzy string matcher according to an embodiment of the present invention.

FIG. 4 contains a functional block diagram of a fuzzy string matcher employing bigram hashing according to an embodiment of the present invention. Two one-byte registers 20 and 22 each store one character of the input character string. Registers 20 and 22 therefore collectively store one bigram. At each clock pulse, the value in register 20 shifts into register 22, and a new character is input into register 20.

Two bigram count arrays 26 and 28 store the bigram counts. Array 26 stores the bigram count for the misread, or test string. Array 28 stores the bigram count for the reference string read from the lexicon data base. The bigram count arrays form wide, shallow, sparsely-filled memory for string bigram counts. The number of array elements depends upon the size of the input character set. If the comparisons use only alphabetic characters independent of case, then arrays of 1024 elements suffice. If the full ASCII set is used, $2^{14}$ elements are required.

The storage required for N-gram counts can be reduced by modifying the hashing logic. As noted, the hashed arrays are sparsely filled. Some array elements, in fact, will almost never be filled because they represent combinations that are very rare. Depending upon the application, distinguishing between these very rare N-grams may not be worth the storage required to keep separate counters for all of them. The hashing logic, being a look-up table, can map the uncommon N-grams to one, or optionally, a few selected addresses in the count arrays.

In the bigram implementation of FIG. 4, each element of the array is two bits wide. The two-bit width assumes that the same bigram rarely occurs more than three times in a given string. Larger element widths can be used as appropriate. Another way to reduce storage, however, is to use N-gram count arrays which vary in the width of their elements. Common N-grams are mapped to elements several bits wide, while uncommon N-grams are mapped to small (e.g., one-bit) elements. In this architecture, separate counter overflow logic for each element width may be used.

Optionally, the N-gram hashing can be implemented using only one bit. The bigram counters are Boolean flags showing whether the given bigram occurred at least once. This structure also reduces storage requirements. In addition, this structure simplifies the difference update logic (discussed below) by making the difference between Manhattan and squared Euclidean distances moot since the only update value is a 1.

The bigram arrays are also constructed to permit fast clearing of the array elements. Array 26 is cleared every time a new test string is entered. Array 28 is cleared before each reference string is loaded from the lexicon data base. One standard integrated circuit suitable for this purpose is a Cypress CY7C150 1024×4 static RAM which allows all locations to be reset in two clock cycles.

Arrays 26 and 28 share a common address bus which is driven by bigram hashing logic 30. Bigram hashing logic 30 translates the values stored in character registers 20 and 22 into the bigram array addresses. A mask programmable ROM look-up table may be used for this purpose.

Optionally, if the characters are in ASCII code, the N-gram hashing logic may comprise merely passing through bits 0–4 and discarding any remaining bits. This type of logic directly supplies a 5N-bit address into the N-gram count array. The "logic" involves no active parts and maps several ASCII codes into the same address, e.g., upper and lower case representatives of the same letter. The ASCII code equivalents using the 5-bit scheme are tabulated in Table 1.

Another way to implement the hashing logic is by placing a look-up table before input registers 20 and 22. The look-up table is relatively small since it only takes the 7-bit ASCII input to a 5-bit output. The look-up table may be a simple table which leaves the relevant bits of letters unchanged, but maps all other non-blank characters into a confusion code. A yet more interesting look-up table would map numbers in a way that attempts to reverse known possible errors in recognition—for example, 6 maps to the same code as G, 5 to the same code as S, 0 to the same code as O, etc. An example look-up table is presented in Table 2.

Figures 5, 5A:
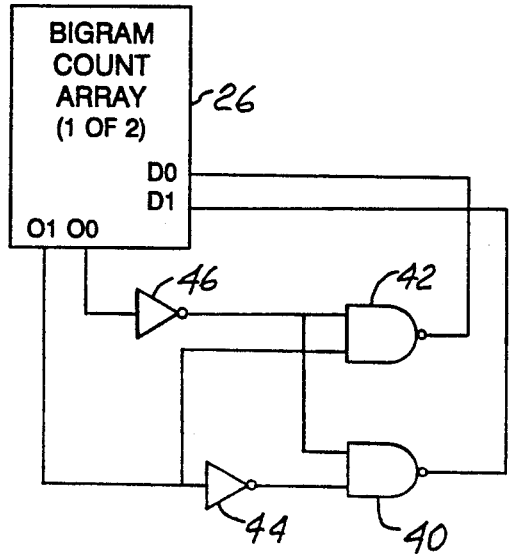
FIG. 5 is a block diagram of bigram count increment circuit according to an embodiment of the present invention.

The output of arrays 26 and 28 are forwarded to difference update logic 32 which contains logic circuits for incrementing the appropriate bigram count and calculating the update for the total string distance. The value read from the bigram count array must be incremented and rewritten to the same location in the array. Since the array elements are small (2 bits), the increment logic saturates at a count of 3 to avoid overflow. The increment logic to generate the new two-bit value requires two NAND gates, 40 and 42, and two inverters, 44 and 46, as shown in FIG. 5. The increment logic of FIG. 5 is repeated for array 28, such that there exists one increment logic circuit for each bigram count array. Only one array is updated on a given input cycle, during which the write-enable of the remaining array is held inactive.

The operations of difference update logic 32 do not depend on which type of string, test or reference, is being loaded, except that: only one bigram count array is updated at a time; and opposite directions of subtraction are used. The two modes are thus symmetric, and the designation of one mode for test strings and the other for reference strings is entirely arbitrary.

Figure 6:
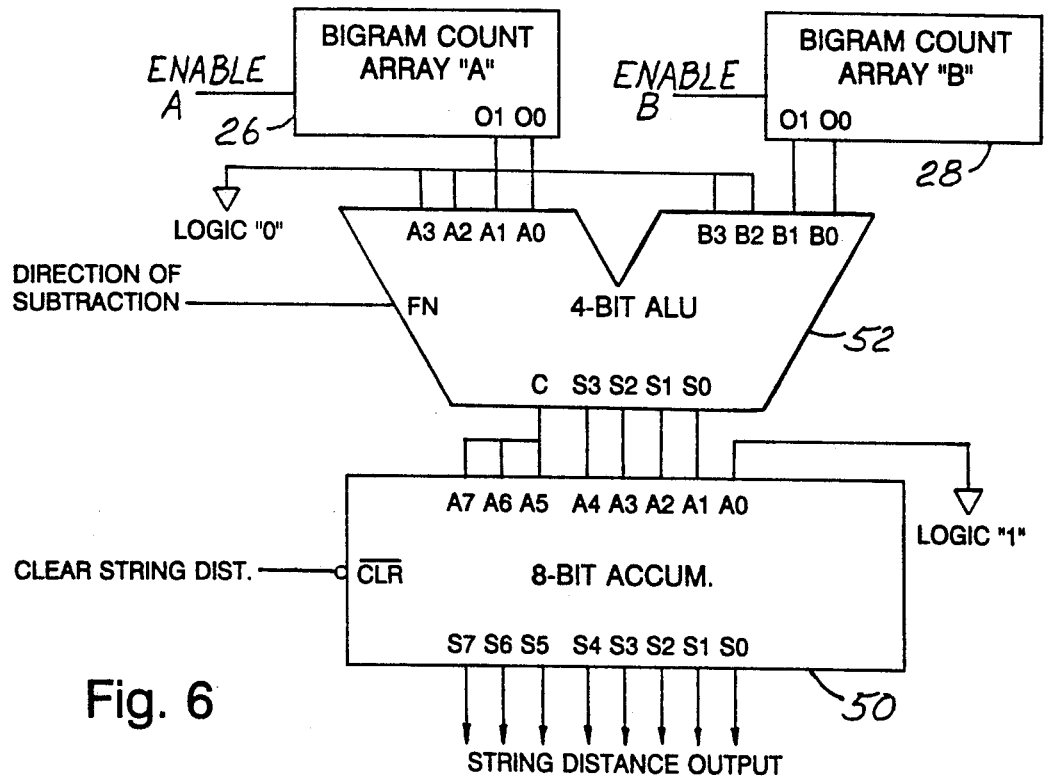
FIG. 6 is a block diagram of a difference update logic circuit to an embodiment of the present invention.

The difference update logic 32 also contains the logic circuit of FIG. 6. This logic circuit determines the change in the total string distance due to an update of one bigram count array element and generates a distance update value which is output to the string distance accumulator 50. Recall that, for Euclidean distance, the update is given as $2(B-A)+1$. The $(B-A)$ term can be calculated by an arithmetic logic unit (ALU) 52. The multiplication by 2 is obtained in hardware by shifting the wires one binary place as shown in FIG. 6, and routing ALU 52 low-order output (S0) to the second-lowest input (A1) of the string distance accumulator 50. This circuit leaves the low-order accumulator input (A0) free, and the '+1' term in the update is gained by wiring that input to a high logic level.

The same FIG. 6 circuit is used if the bigram element being incremented is in bigram count array A rather than B. The only change is that the direction of subtraction in the ALU is reversed. The ALU 52 output is sign-extended to match the width of string distance accumulator 50. This task is done by wiring the highest output, or carry bits, of ALU 52 to the several highest inputs (A5-A7) of the accumulator.

When Manhattan distance is employed, the incremental difference is simply ±1. The Euclidean and Manhattan cases are distinguished by use to which the carry output of ALU 52, which is 0 for a positive difference and 1 for a negative difference, is put. In FIG. 5, the lowest bit (A0) input to string distance accumulator 50 is wired to a '1' level. Therefore, the correct binary number will be present on the inputs of string distance accumulator 50 if the carry bit from ALU 52 is copied to all the accumulator inputs except A0. Thus only four signals differ between the Manhattan and the Euclidean cases, namely, inputs A1-A4 of string distance accumulator 50.

Figure 7:
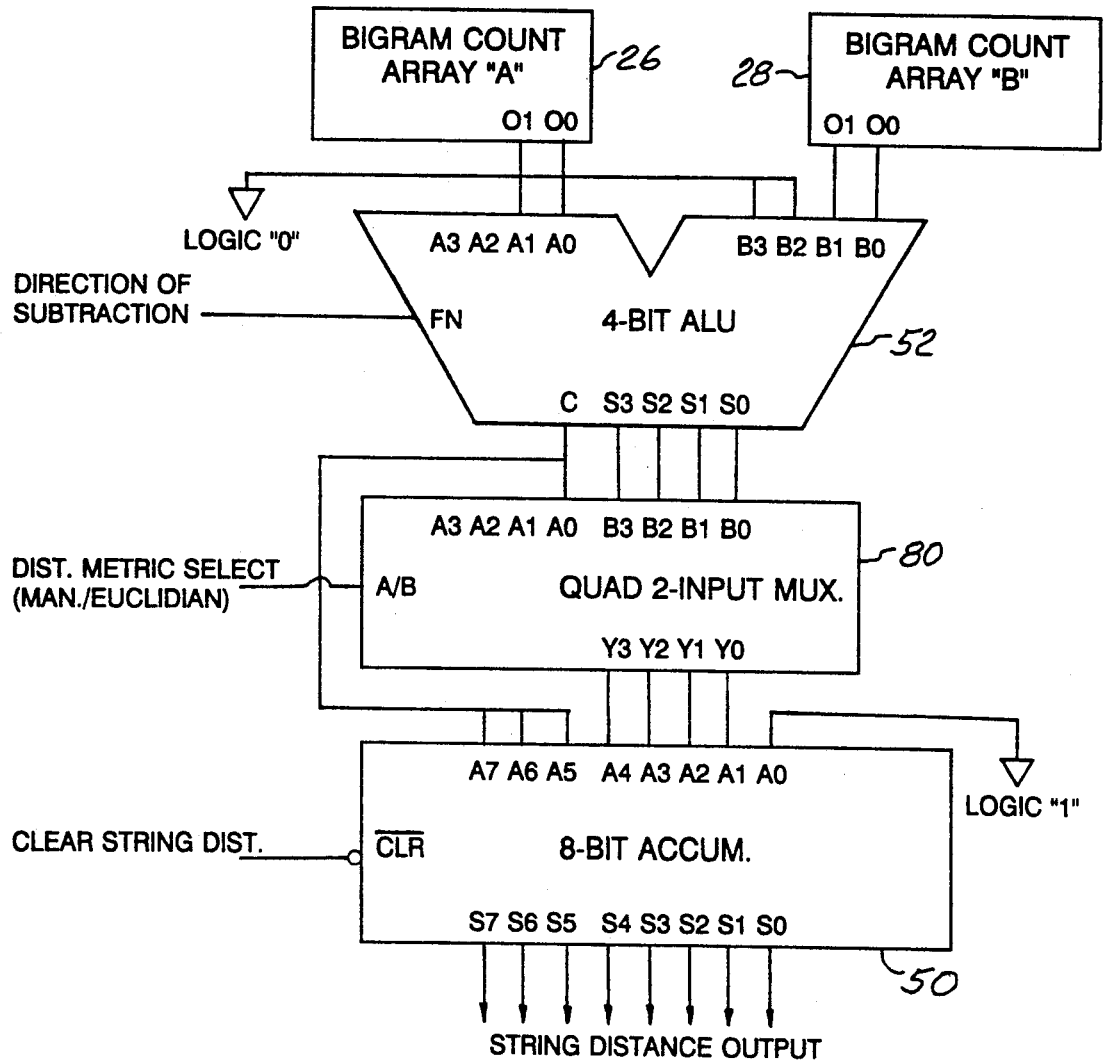
FIG. 7 is a block diagram of a difference update logic circuit with selectable distance metric according to an embodiment of the present invention.

FIG. 7 contains a logic diagram of an update logic circuit having a selectable distance metric. A two-input, four-bit-wide multiplexer 80 can be provided to select between the Euclidean inputs (ALU outputs S0-S3) and the Manhattan input (the carry bit from ALU 52). An external input 82 selects between the two distance metrics by selecting which of the multiplexer's two inputs is passed to its output.

Other distance metrics can be accommodated by replacing ALU 52 with a look-up table. Fuse link bipolar or CMOS PROMS may be used. If the present invention is fabricated as a single chip, a mask programmed ROM may be used to reduce costs by eliminating the need for external programming pins.

The output of difference update logic 32 is input to string distance accumulator 50. String distance accumulator 50 is an adder which is initialized to zero before a misread character string is loaded, and then is updated on each clock cycle by adding the output of difference update logic 32 to previous contents of string distance accumulator 50.

If Manhattan distance is used, each bigram causes the total string distance to be incremented or decremented by 1. If only Manhattan distance were to be used, or if the Boolean flag logic described above were implemented, string distance accumulator 50 may be implemented as an up/down counter such as an 8-bit counter.

If Euclidean distance is used, string distance accumulator 50 is a true 2's complement adder. Although total Euclidean distances are larger than the corresponding Manhattan distances, an 8-bit accumulator may still be used.

The output of the circuits in FIG. 4 is a string distance for each pair of test and reference strings. This output is still a large amount of data for the host processor to handle. Since usually only the best matches will be of interest, the burden on the host processor can be reduced by adding comparison logic 5 as seen in FIG. 1 to the circuit of FIG. 4. In the simplest form, a single comparator (not shown) could be used to disqualify the outputs having holographic distances which exceed a programmed threshold stored in a register. Optionally, the best matching logic could be constructed, using techniques well known to those skilled in the art, to select the m closest valid strings. The host processor then sorts the qualifying outputs.

The present invention may be implemented on either a chip-level or board-level. One VLSI chip can hold all the functional blocks shown in FIG. 4. An internal clock signal is required to update the internal N-gram count array RAM. Both a read and a write must be performed for every byte latched into the input register. These functions are controlled by an internal clock operating at twice the speed of the input latch clock. External connections include the character input string port, which may be a 7-bit ASCII input port; the 8-bit string distance output(s); and control functions such as clearing registers, count array A/B select, and distance metric select.

The components of the present invention can be TTL or CMOS parts and may be able to operate on a lexicon faster than the lexicon can be fetched over a bus. To improve system operation, the lexicon memory and the string matching circuit of the present invention can be combined on a single board with a private data path. In the Postal Service application, a small subset of ZIP codes will most likely account for most of the accesses. A cache memory may be used to cache that subset of the ZIP lexicons, and provide the ability to fetch lexicons from the bus if they are not stored in the cache.

The number of adjacent letters used for the N-gram hashing affects the hardware design in the following ways:

(1) The input shift register requires one stage for each letter in the N-gram;
(2) The N-gram count arrays must be wide enough to contain entries for all the N-grams that are to be distinguished;
(3) The N-gram hashing logic must accommodate the given number of inputs from the shift register and the given number of distinct elements in the count arrays; and
(4) The number of bits in each N-gram counter array element decreases with larger N-grams.

In the circuits of FIGS. 4-7 described above, bigram hashing is used. Bigrams represent a reasonable tradeoff between performance and storage cost. Counting monograms may not provide good enough string-matching ability, while trigrams require much storage capacity. In addition, if the recognition engine is quite error-prone, trigram hashing may give poor performance because the chances of reading three letters in a row correctly will be small. Combinations of N-grams of different degrees may be useful. Such a combination system requires separate count arrays and update logic for the two types of N-grams, with their results being added for output.

Figure 8:
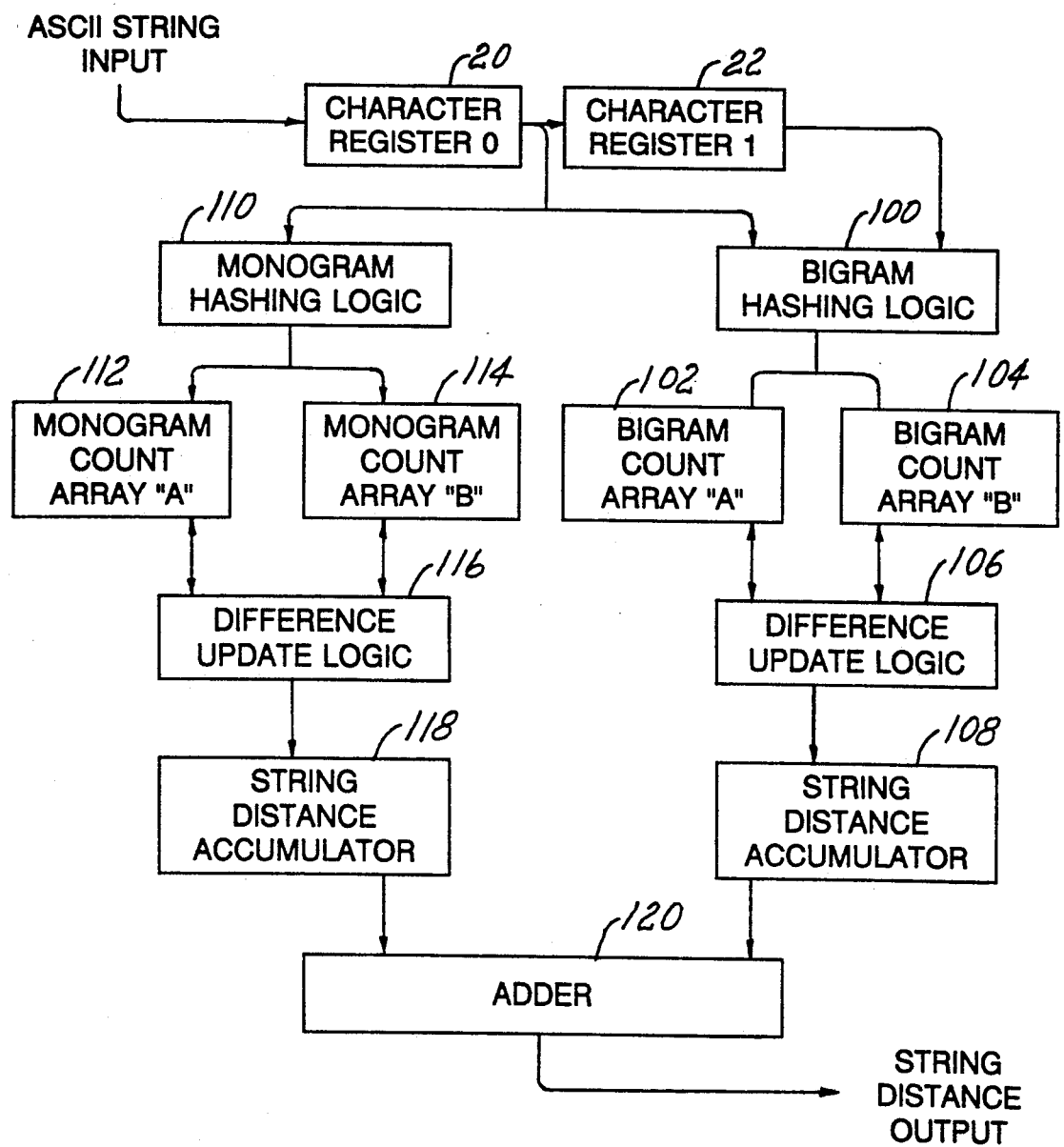
FIG. 8 is a block diagram of a string matching circuit using both bigram and monogram hashing according to an embodiment of the present invention.

FIG. 8 is a block diagram of another embodiment of a string matching circuit employing N-grams of different degrees. In the structure of FIG. 8, the bigram is input into registers 20 and 22 as in the circuit of FIG. 4. The bigram is addressed by bigram hashing logic 100 for input into array 102 and 104 as appropriate. Difference update logic 106 and string distance accumulator 108 operate as described above in conjunction with FIG. 4.

Simultaneously with the operation of the bigram hashing circuit, a monogram hashing operation is performed on the character input to register 20. The monogram address of the appropriate array is addressed by monogram hashing logic and the corresponding element of array 112 and 114 is incremented by difference update logic 116. Difference update logic 116 also updates the holographic distance and forwards this valve to string distance accumulator 118. The output of string distance accumulators 108 and 118 are combined by adder 120 to obtain the total holographic distance.

In combined systems, the various N-gram paths are independent except for the shared character registers and the address used to combine the results. Table 3 indicates the part count for the embodiment of FIG. 8. Table 4 tabulates the gate and register count according to the N-gram degree.

SOFTWARE IMPLEMENTATION

The present invention may also be implemented in software on a general-purpose computer. However, the smallest practical storage location is one 8-bit byte. Therefore, the storage required for the N-gram count arrays is larger than in the hardware implementation. Furthermore, since a given N-gram probably won't occur more than 255 times in one string, the update logic can dispense with overflow detection.

The speed of the software is impacted by the need to clear each element in the N-gram count arrays before they are reloaded. Speed improvements can be had by keeping a list of the elements that have been used and clearing only those elements.

If bigram hashing is used, the hardware approach of using look-up tables for the hashing and update logic is emulated in software to attain high speed. If trigrams are used, these tables, particularly the N-gram hashing logic table, may become too large to be practicable.

Figure 9:
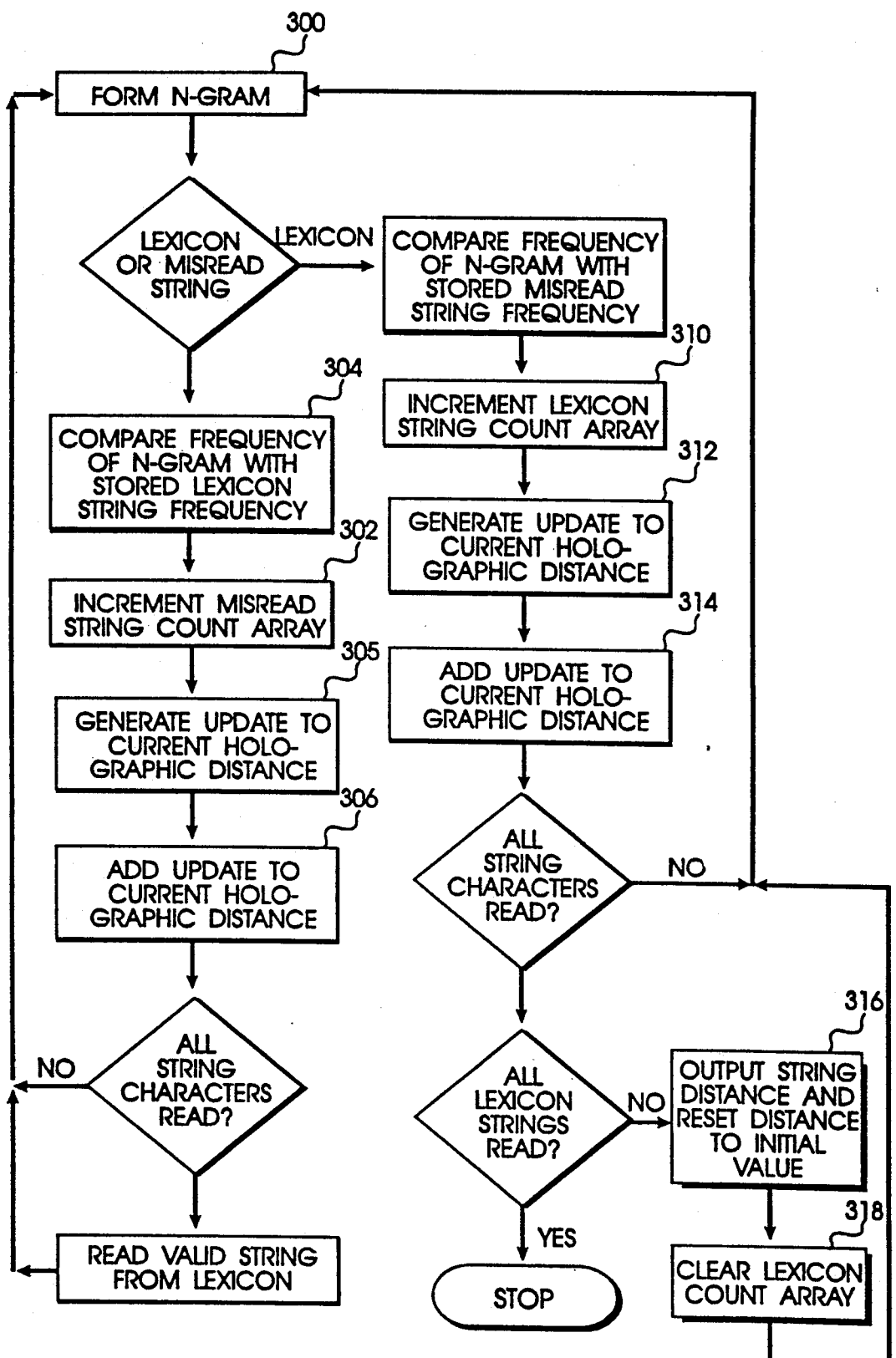
FIG. 9 is a flow chart of a fuzzy string matcher implemented in software according to an embodiment of the present invention.

FIG. 9 is a flow chart of a software embodiment of the present invention. In step 300, N adjacent characters of a character string are read to form an N-gram. If the character string is the misread character string, then the frequency of this N-gram is written to the misread string count array in step 302. This frequency is compared to the frequency value stored in lexicon array in step 304. The value in the lexicon array is, however, zero since no lexicon string has been processed. This comparison yields a distance update in step 306 which is then summed, in step 308, with the current holographic distance to form an updated holographic distance.

Once steps 300-308 have been performed for each N-gram in the misread string, the first of the lexicon strings is put in N-gram form and the frequency of each N-gram stored. (See step 310). As each lexicon N-gram frequency is incremented, this increment is used to calculate a new distance update in Step 312. This distance update is added to the current holographic distance in step 314 to obtain a new updated holographic distance.

After all the characters of the lexicon string are processed, the lexicon array values are cleared in step 316 and the current holographic distance variable is set to the value between the misread array and the cleared lexicon array. See step 318. A new lexicon string may then be processed and steps 308-318 repeated for each of the strings contained in the lexicon.

ILLUSTRATIVE EXAMPLE

During the processing of addresses read from U.S. Mail, the character recognition engine of a data processing system fails to recognize the first character of the street name "Sandy Ln" The street name is improperly identified as "?andy Ln", however the ZIP code has been properly read by the character reader. The present invention is employed to identify those valid street names stored in a lexicon of valid street names for that ZIP code such that the correct street name can be identified.

The first character of the misread character string is input to register 20 of FIG. 4 on the first cycle. In this example, the confusion character "?" is used in the bigram hashing process, and this character is input into register 20. On the second cycle, the confusion character "?" is shifted into register 22, and the next character in the word "a" is placed in register 20. The bigram "?a" is now contained in character registers 20 and 22.

Bigram hashing logic 30, which can be a ROM lookup table, then addresses the element "?a" in bigram count array 26. That element is then incremented by one, by the logic circuit of FIG. 5. Distance update logic 32 then computes the holographic distance between the updated element "?a" of array 26 and the element ?a in array 28. No character string has been read into array 28 at this point in the device operation, so all elements of array 28 are at an initial value of zero. The Euclidean distance update is $2(B-A)+1$ or $2(0-0)+1$ and therefore the current holographic distance is one.

On the next clock cycle, the next character, "n" is placed in register 20 of FIG. 4 and the character "a" is shifted into register 22, forming a new bigram "an". This element of bigram count array 26 is then addressed by bigram hashing logic 30. Distance update logic 32 compares the present value to the corresponding element in array 28 and increments this element by one. The current holographic distance stored in accumulator 50 is thus incremented by one. This process is repeated until all the characters of the misread string are entered into the registers. The value of the holographic distance, once all the misread string characters have been entered into array 26 is the initial holographic distance. In this example, the initial holographic distance is seven.

Once the misread string has been completely entered, the valid character strings are loaded from the lexicon data base into the circuit of FIG. 4. For simplicity, the lexicon data base of this example contains the valid street names: "Sandy Ln," "Windy Ln" and "Anna Ln"

The first two characters of the first lexicon string "sandy ln" are then entered into registers 20 and 22 in the manner described above. Bigram hashing logic 30 then addresses this element, "sa". The write enable of array 26 is now deasserted and the write enable of array 28 is asserted. Thus, the element "sa" of array 28 is incremented by one. Difference update logic 32 computes the holographic distance update. Array 26 contains no nonzero entry in element "sa" and therefore the holographic distance update is: 2(0−0)+1, or one. The update value of one is added to the initial holographic distance of seven for a current holographic distance of eight.

On the next cycle, the next character "n" is entered to register 20, forming the new bigram "an". This element in array 28 is then addressed and incremented by one. This particular bigram element now occurs in both arrays 26 and 28. Difference update logic 32 updates the holographic distance in response to this update. The Euclidean update is 2(0−1)+1 which equals negative one, The holographic distance is therefore decreased by one for a current holographic distance of seven. The above processes are repeated until each character of the lexicon string is entered. This pipelined updating process greatly improves processing speed by avoiding the need to hash each lexicon record and compute holographic distance as separate discrete steps. The holographic distance between the string "?andy ln" and "sandy ln" is subsequently calculated as having the value 2.

Once the holographic distance has been determined for the lexicon string "sandy ln", array 28 is cleared to zero and string distance accumulator 50 is cleared to the original distance value between the test string and the empty array. In this example, this original value is seven. The next character string from the lexicon, "windy ln" is then input to the registers and arrays in the same manner as described above for the string "sandy ln". The holographic distance is computed to be four. The array is then cleared to zero and the string distance accumulator is cleared to seven. The entire process repeats for the string "anna ln".

The output of the fuzzy string matcher of the present invention yields the holographic distances between the misread string and the lexicon string for each of the strings contained in the lexicon. In this example, the holographic distances are as identified in Table 5. These string distances can then be output to a best match caching logic to determine the best matching data base records for forwarding to the host processor.

A preferred embodiment of the invention has been described herein. Variations and modifications will be readily apparent to those of ordinary skill in the art. For this reason the invention should be construed in light of the claims.

TABLE 1

ASCII codes equivalent in low 5 bits
(*) indicates non-printable codes

| Low 5 bits | High 2 bits | | | |
|---|---|---|---|---|
| | 00 | 01 | 10 | 11 |
| 00000 | NULL (*) | blank | @ | ` |
| 00001 | (*) | ! | A | a |
| 00010 | (*) | " | B | b |
| 00011 | (*) | # | C | c |
| 00100 | (*) | $ | D | d |
| 00101 | (*) | % | E | e |
| 00110 | (*) | & | F | f |
| 00111 | (*) | ' | G | g |
| 01000 | (*) | ( | H | h |
| 01001 | (*) | ) | I | i |
| 01010 | (*) | * | J | j |
| 01011 | (*) | + | K | k |
| 01100 | (*) | , | L | l |
| 01101 | (*) | - | M | m |
| 01110 | (*) | . | N | n |
| 01111 | (*) | / | O | o |
| 10000 | (*) | 0 | P | p |
| 10001 | (*) | 1 | Q | q |
| 10010 | (*) | 2 | R | r |
| 10011 | (*) | 3 | S | s |
| 10100 | (*) | 4 | T | t |
| 10101 | (*) | 5 | U | u |
| 10110 | (*) | 6 | V | v |
| 10111 | (*) | 7 | W | w |
| 11000 | (*) | 8 | X | x |
| 11001 | (*) | 9 | Y | y |
| 11010 | (*) | : | Z | z |
| 11011 | (*) | ; | [ | { |
| 11100 | (*) | < | \ | \| |
| 11101 | (*) | = | ] | } |
| 11110 | (*) | > | ^ | ~ |
| 11111 | (*) | ? | _ | (*) |

TABLE 2

Example Lookup Table

| Output | ASCII characters mapped to that output |
|---|---|
| 00000 | blank |
| 00001 | A a 4 |
| 00010 | B b 3 8 |
| 00011 | C c [ ( < { |
| 00100 | D d ] ) |
| 00101 | E e |
| 00110 | F f |
| 00111 | G g 6 |
| 01000 | H h # |
| 01001 | I i 1 ! \| |
| 01010 | J j |
| 01011 | K k |
| 01100 | L l |
| 01101 | M m |
| 01110 | N n |
| 01111 | O o 0 |
| 10000 | P p |
| 10001 | Q q @ |
| 10010 | R r |
| 10011 | S s 5 $ |
| 10100 | T t + |
| 10101 | U u |
| 10110 | V v |
| 10111 | W w |
| 11000 | X x |
| 11001 | Y y |
| 11010 | Z z 2 |
| 11011 | ? |
| 11100 | . , ' ` : ; |
| 11101 | - _ = ~ ^ / |
| 11110 | all codes not shown above, except NULL |
| 11111 | NULL |

TABLE 3

Gate and Register Count
For an Embodiment
Corresponding to FIG. 8

| Functional Block | Ref. # | Components Required |
|---|---|---|
| Character Register "0" | (20) | 1 register of 5 to 7 bits |
| Character Register "1" | (21) | 1 register of 5 to 7 bits |
| Bigram Hashing Logic | (100) | 16k × 10-bit ROM lookup table = 20k bytes (may be omitted) |

TABLE 3-continued

Gate and Register Count
For an Embodiment
Corresponding to FIG. 8

| Functional Block | Ref. # | Components Required |
|---|---|---|
| Monogram Hashing Logic | (110) | 128 × 5-bit ROM lookup table = 80 bytes (may be omitted) |
| Bigram Count Array "A" | (102) | 1k × 2-bit static RAM = 256 bytes |
| Bigram Count Array "B" | (104) | 1k × 2-bit static RAM = 256 bytes |
| Monogram Count Array "A" | (112) | 32 × 3-bit static RAM = 12 bytes |
| Monogram Count Array "B" | (114) | 32 × 3-bit static RAM = 12 bytes |
| Bigram Difference Update Logic | (106) | Approx. 8 gates as in FIG. 5, 1 4-bit adder/substractor as in FIG. 6 |
| Monogram Diff. Update Logic | (116) | Approx. 16 gates, 1 4-bit adder/subtractor |
| String Distance Accumulator | (108) | 1 8-bit adder, 1 8-bit register |
| String Distance Accumulator | (118) | 1 8-bit adder, 1 8-bit register |
| Adder | (120) | 1 8-bit adder |

TABLE 4

Gate and Register Count by Degree of N-Grams Used

| Functional Block | Gates, Registers, Memory Required | | | Comments |
| | Monograms | Bigrams | Trigrams | |
|---|---|---|---|---|
| Character Register | 1 register of 5 to 7 bits | 2 registers of 5 to 7 bits | 3 registers of 5 to 7 bits | Largest N-Gram gives the number required by a combined system |
| N-Gram Hashing Logic | 128 × 5-bit ROM = approx 80 bytes | 16k × 10-bit ROM = 20k bytes | (32k to 2M) × 15-bit ROM = 64k to 4M bytes | May be omitted altogether |
| N-Gram Count Array (each of two) | 32 × 3-bit RAM = 12 bytes | 1k × 2-bit RAM = 256 bytes | 32k × 1-bit RAM = 4k bytes | Static RAM with clear |
| Difference Update Logic | Approx. 16 gates, 1 4-bit adder/subtractor | Approx. 8 1 4-bit adder/subtractor | No active components (due to 1-bit counters in N-Gram Count Arrays) | Bigram example is shown FIGS. 5 and 6 |
| String Distance Accumulator | 1 8-bit adder 1 8-bit register | 1 8-bit adder 1 8-bit register | 1 8-bit up/down counter | |

TABLE 5

Bigram Distances Between Street Names
(simulated errors, best 3 matched in Zip area)

| String Read As | Best Matches | Distance |
|---|---|---|
| ?andy Ln | Sandy Ln | 2 |
| | Windy Ln | 4 |
| | Anna Ln | 7 |

What is claimed is:

1. A method for comparing a test character string to a plurality of valid data strings to identify valid data strings which closely match the test character string, comprising the steps of:
   (a) subdividing the test character string into sets of N adjacent characters;
   (b) storing in a first count array a frequency of one set of N adjacent characters in the test string;
   (c) comparing said frequency to an initial frequency value to obtain an initial holographic distance;
   (d) repeating step (b) and (c) for all sets of N adjacent characters formed in step (a);
   (e) subdividing a given valid data string into sets of N adjacent characters;
   (f) storing in a second count array a frequency of one set of N adjacent characters found in said given valid character string;
   (g) comparing said frequency of said set of N adjacent characters found in the test character string to said frequency of said given set of N adjacent characters found in said valid character string to obtain an updated holographic distance;
   (h) repeating steps (f) and (g) for all sets of N adjacent characters formed in step (e);
   (i) clearing said updated holographic distance to said initial holographic distance and clearing said second count array to an initial value; and
   (j) repeating steps (e) through (i) inclusive for each of said plurality of valid character strings.

2. The method for comparing of claim 1 wherein step (a) and step (e) comprise the step of reading a given set of an adjacent characters into a register.

3. The method for comparing of claim 1 further comprising the step of storing a current holographic distance and wherein step (g) further comprises the steps of:
   computing a squared Euclidean distance between said frequency of said given set of N adjacent characters found in the test character string and said frequency of said given set of N adjacent characters found in said valid character string to form a distance update;
   adding said distance update to said current holographic distance to form said updated holographic distance; and
   storing said updated holographic distance as said current holographic distance.

4. The method for comparing of claim 1 further comprising the step of storing a current holographic distance and wherein step (g) further comprises the steps of:
   computing a Manhattan distance between said frequency of said given set of N adjacent characters found in the test character string and said frequency of said given set of N adjacent characters found in said valid character string to form a distance update;
   adding said distance update to said current holographic distance to form said updated holographic distance; and storing said updated holographic distance as said current holographic distance.

5. The method for comparing of claim 1 further comprising the step of selecting a subset of valid character strings as a function of the holographic distances from the test character string.

6. A device for comparing a test character string to a plurality of valid data strings of a lexicon to identify valid data strings which closely match the test character string comprising:
- a set of N registers, having an input coupled to said lexicon and to said test character string, for inputting a set of N adjacent characters to form a given N-gram;
- a set of N registers, having an input coupled to said lexicon and to said test character string, for inputting a set of N adjacent characters to form a given N-gram;
- a hashing logic circuit coupled to an output of said set of N registers, for asserting a count array address corresponding to the given N-gram;
- a first count array, having an input coupled to an output of said hashing logic circuit, for storing a frequency of said given N-gram in the test character string;
- a second count array, having an input coupled to an output of said hashing logic circuit, for storing a frequency of said given N-gram in a given valid character string;
- means, coupled to said input of said first and second count arrays and to an output of said first and second count arrays, for incrementing said frequencies stored in said first and second count arrays;
- an arithmetic logic unit for comparing said frequency stored in said first array to said frequency stored in said second array to obtain a distance update and having:
  (i) a first set of inputs coupled to said first array;
  (ii) a second set of inputs coupled to said second array; and
  (iii) an output having m sum bits and a single carry bit; and
- an accumulator for updating a current holographic distance to obtain an updated holographic distance and having:
  (i) a lowest order input coupled to an asserted signal;
  (ii) m inputs coupled to said m sum bits of said arithmetic logic unit;
  (iii) a most significant bit coupled to said carry bit of said arithmetic logic unit; and
  (iv) an output.

7. The device of claim 6 further comprising a means, coupled to said means for adding, for selecting a subset of said valid character strings.

8. The device of claim 7 wherein said means for selecting comprises a comparator.

9. The device of claim 6 wherein said first and said second count arrays each comprise a static random access memory.

10. The device of claim 6 wherein said first and second count arrays each comprise:
- a plurality of storage elements having a first width; and
- a plurality of storage elements having a second width.

11. The device of claim 6 wherein said hashing logic comprises a look-up table.

12. The device of claim 6 wherein said means for adding comprises a two's complement adder.

13. The device of claim 6 wherein said first and second count arrays store a plurality of Boolean flags.

14. A device for comparing a test character string to a plurality of valid data strings of a lexicon to identify valid data strings which closely match the test character string comprising:
- a set of N registers, having an input coupled to said lexicon and to said test character string, for inputting a set of N adjacent characters to form a given N-gram;
- a hashing logic circuit coupled to an output of said set of N registers, for asserting a count array address corresponding to the given N-gram;
- a first count array, having an input coupled to an output of said hashing logic circuit, for storing a frequency of said given N-gram in the test character string;
- a second count array, having an input coupled to an output of said hashing logic circuit, for storing a frequency of said given N-gram in a given valid character string;
- means, coupled to said input of said first and second count arrays and to an output of said first and second count arrays, for incrementing said frequencies stored in said first and second count arrays;
- an arithmetic logic unit for comparing said frequency stored in said first array to said frequency stored in said second array to obtain a distance update and having:
  (i) a first set of inputs coupled to said first array;
  (ii) a second set of inputs coupled to said second array; and
  (iii) an output having m sum bits and a single carry bit; and
- an accumulator for updating a current holographic distance to obtain an updated holographic distance and having:
  (i) a lowest order input coupled to an asserted signal;
  (ii) m inputs coupled to said m sum bits of said arithmetic logic unit;
  (iii) a most significant bit coupled to said carry bit of said arithmetic logic unit; and
  (iv) an output.

15. The device of claim 14 wherein said first and second count arrays each comprise static random access memory.

16. The device of claim 14 wherein said first and second count arrays each comprise:
- a plurality of storage elements having a first width; and
- a plurality of storage elements having a second width.

17. The device of claim 14 wherein said accumulator comprises a two's complement adder.

18. The device of claim 14 wherein said hashing logic comprises a look-up table.

19. The device of claim 14 further comprising a means, coupled to said accumulator, for selecting a subset of said valid character strings.

20. The device of claim 19 wherein said means for selecting comprises a comparator.

21. A device for comparing a test character string to a plurality of valid data strings to identify valid data strings which closely match the test character string comprising:

a set of N registers, having an input coupled to a lexicon and to the test character string, for inputting a set of N adjacent characters to form a given N-gram;

a hashing logic circuit coupled to an output of said set of N registers, for asserting a count array address corresponding to the given N-gram;

a first count array, having an input coupled to an output of said hashing logic circuit, for storing a frequency of said given N-gram in a given valid character string read from said lexicon;

means, coupled to said input of said first and second count arrays and to an output of said first and second count arrays, for incrementing said frequencies stored in said first and second count arrays;

an arithmetic logic unit for comparing said frequency stored in said first array to said frequency stored in said second array to obtain a distance update and having:

(i) a first set of inputs coupled to said second array;

(ii) a second set of inputs coupled to said second array; and (iii) an output having m sum bits and a single carry bit;

a multiplexer, having a first input coupled to said m sum bits of said arithmetic logic unit, a second input coupled to said carry bit of said arithmetic logic unit and m outputs; and an accumulator for updating a current holographic distance to obtain an updated holographic distance and having:

(i) a lowest order input coupled to an asserted signal;

(ii) m inputs coupled to said m outputs of said multiplexer;

(iii) a most significant bit input coupled to said carry bit of said arithmetic logic unit; and (iv) an output.

22. The device of claim 21 wherein said first and second count arrays each comprise static random access memory.

23. The device of claim 21 wherein said first and second count arrays each comprise: a plurality of storage elements having a first width; and a plurality of storage elements having a second width.

24. The device of claim 21 wherein said accumulator comprises a two's complement adder.

25. The device of claim 21 wherein said hashing logic comprises a look-up table.

26. The device of claim 21 further comprising a means, coupled to said accumulator, for selecting a subset of said valid character strings.

27. The device of claim 26 wherein said means for selecting comprises a comparator.

28. A device for comparing a test character string to a plurality of valid data strings of a lexicon to identify valid data strings which closely match the test character string comprising:

a set of N registers, having an input coupled to said lexicon and to said test character string, for inputting a set of N adjacent characters to form a given N-gram;

a first hashing logic circuit, coupled to an output of said set of N registers, for asserting a first count array address corresponding to the given N-gram;

a first count array, having an input coupled to an output of said first hashing logic circuit, for storing a frequency of said given N-gram in the test character string;

a second count array, having an input coupled to an output of said first hashing logic circuit, for storing a frequency of said given N-gram in a given valid character string read from said lexicon;

means, coupled to said input of said first and second count arrays and to an output of said first and second count arrays, for incrementing said frequencies stored in said first and second count arrays;

means, having an input coupled to said output of said first and second count arrays, for comparing said frequency stored in said first count array and said frequency stored in second count array to obtain a first distance update;

means, coupled to an output of said means for comparing, for adding said first distance update to a current holographic distance to obtain a first updated holographic distance;

a second hashing logic circuit, coupled to M outputs of said set of N registers, for asserting a second count array address corresponding to the M outputs wherein M<N;

a third count array, having an input coupled to an output of said second hashing logic circuit, for storing a frequency of a given M-gram in the test character string;

a fourth count array, having an input coupled to an output of said second hashing logic circuit, for storing a frequency of said given M-gram in a given valid character string read from said lexicon;

means, coupled to said input of said third and fourth count arrays and to an output of said third and fourth count arrays, for incrementing said frequencies stored in said third and fourth count arrays;

means, having an input coupled to said output of said third and fourth count arrays, for comparing said frequency stored in said third count array and said frequency stored in said fourth count array to obtain a second distance update;

means, coupled to an output of said means for comparing, for adding said second distance update to a second current holographic distance to obtain a second updated holographic distance; and means, coupled to said means for obtaining a first updated holographic distance and to said means for obtaining a second updated holographic distance, for adding said first updated holographic distance to said second updated holographic distance to obtain a total updated holographic distance.

29. The device of claim 28 further comprising a means, coupled to said means for obtaining a total updated holographic distance, for selecting a subset of said valid character strings.

30. The device of claim 29 wherein said means for selecting comprises a comparator.

31. The device of claim 28 wherein said first and second count arrays each comprise:

a plurality of storage elements having a first width; and a plurality of storage elements having a second width.

32. The device of claim 28 wherein said third and fourth count arrays each comprise:

a plurality of storage elements having a first width; and a plurality of storage elements having a second width.

33. The device of claim 28 wherein said first and said second hashing logic comprise a look-up table.

34. The device of claim 28 wherein said first and said second count arrays store a plurality of Boolean flags.

35. The device of claim 28 wherein said third and said fourth count arrays store a plurality of Boolean flags.

36. The device of claim 28 wherein said means for obtaining a first updated holographic distance comprises a two's complement adder.

37. The device of claim 28 wherein said means for obtaining a second updated holographic distance comprises a two's complement adder.

38. A system for resolving a character recognition error comprising:
   a set of N registers, having an input coupled to a lexicon and to a test character string, for inputting a set of N adjacent characters to form a given N-gram;
   a hashing logic circuit, coupled to an output of said set of N registers, for asserting a count array address corresponding to the given N-gram;
   a first register array, having an input coupled to an output of said hashing logic circuit, for indicating occurrences of said given N-gram in the test character string;
   a second register array, having an input coupled to an output of said hashing logic circuit, for indicating occurrences of said given N-gram in a given valid character string read from said lexicon;
   an increment circuit coupled to said input of said first and second register arrays and to an output of said first and second register arrays for incrementing respective values stored in said first and second register arrays, the values corresponding to frequencies of said given N-gram in the respective character strings;
   means, having an input coupled to said output of said first and second register arrays, for comparing said frequency stored in said first register array and said frequency stored in said second register array to obtain a distance update; and
   means, coupled to an output of said means for comparing, for adding said distance update to a current holographic distance to obtain an updated holographic distance.

39. The system of claim 38 further comprising a means, coupled to said means for adding, for selecting a subset of said valid character strings.

40. The system of claim 39 wherein said means for selecting comprises a comparator.

41. The system of claim 38 wherein said first and said second register arrays each comprise a static random access memory.

42. The system of claim 38 wherein said first and second register arrays each comprise:
   a plurality of storage elements having a first width; and
   a plurality of storage elements having a second width.

43. The system of claim 38 wherein said hashing logic comprises a look-up table.

44. The system of claim 38 wherein said means for adding comprises a two's complement adder.

45. The system of claim 38 wherein said first and second register arrays store a plurality of Boolean flags.

46. The method for comparing of claim 5 wherein the subset of valid character strings is within a predetermined holographic distance from the test character string.

47. The method for comparing of claim 5 wherein the subset of valid character strings includes not more than a predetermined number of the valid character strings, all other valid character strings having equal or greater holographic distances from the test string.

48. The method for comparing of claim 47 wherein the predetermined number is one.

* * * * *

UNITED STATES PATENT AND TRADEMARK OFFICE
CERTIFICATE OF CORRECTION

PATENT NO. : 5,276,741

DATED : January 4, 1994

INVENTOR(S) : David B. Aragon

It is certified that error appears in the above-identified patent and that said Letters Patent is hereby corrected as shown below:

In Column 2, line 67, "two" should read --a--, and "strings" should read --string--.

Figure 2A:
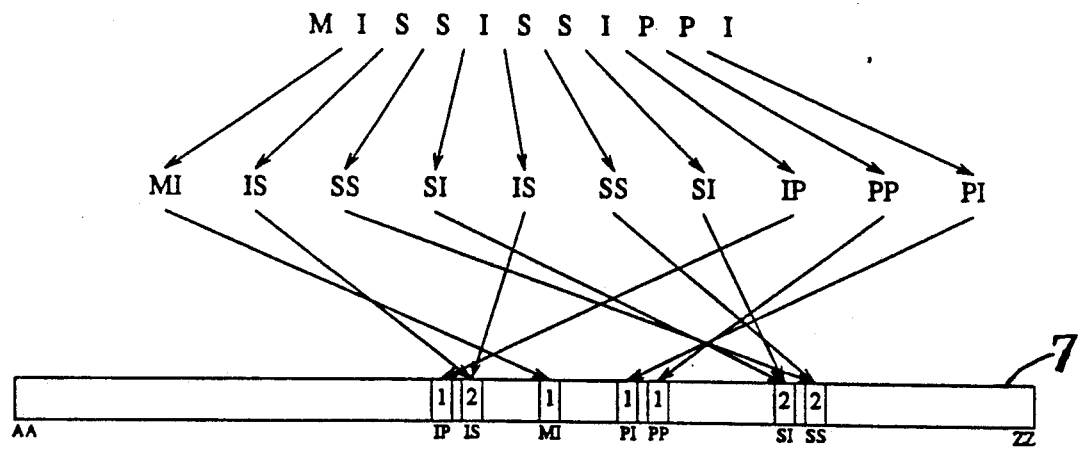
Figure 3A:
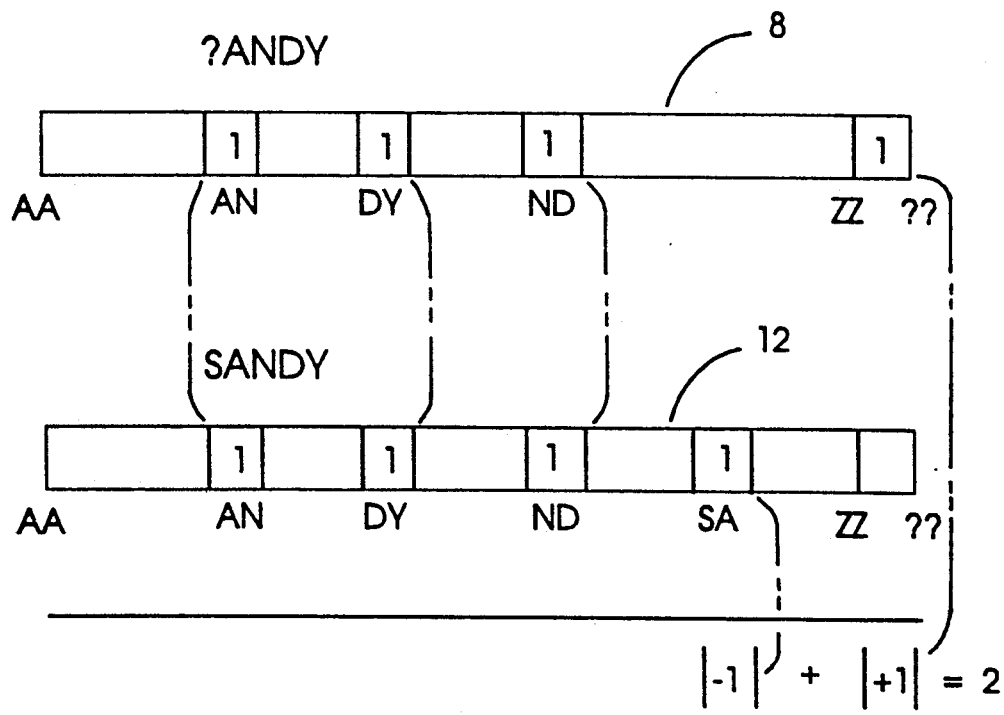

In Column 3, ahead of line 1, insert the following:
    --Fig. 2a shows another illustrative example as in Fig. 2;--;
    ahead of line 4, insert the following:
    --Fig. 3a shows another computational example as in Fig. 3;--; and
    ahead of line 10, insert the following:
    --Fig. 5a is a state diagram for the block diagram of Fig. 5;--.

In Column 4, line 19, "On lines 6 and 7 of Fig 2" should read --With reference to Figs. 2 and 2a--; at line 20, "Lines 6 and 7" should read --An array 6 in Fig. 2 and an array 7 in Fig. 2a, respectively,--; at line 37, "Fig.3" should read --Figs. 3 and 3a--; at line 38, "Fig. 3" should read --Figs. 3 and 3a--; at line 42, "Lines 8 and 9 of Fig. 3" should read --An array 8 in Fig. 3 and a corresponding array 9 in Fig. 3a--; at line 43, change "line 10, to read-- An array 10 in Fig. 3a--; and at line 51, "line 12 of " should read --An array 12 in--.

In Column 7, line 2, "Fig. 5" should read --Figs. 5 and 5a--.

In Column 13, line 40 (Table 4, column 3), "8" should read --8 gates--.

UNITED STATES PATENT AND TRADEMARK OFFICE
CERTIFICATE OF CORRECTION

PATENT NO. : 5,276,741

DATED : January 4, 1994

INVENTOR(S) : David B. Aragon

It is certified that error appears in the above-identified patent and that said Letters Patent is hereby corrected as shown below:

In Column 15, line 15, cancel beginning with "a set of N registers," to and including "N-gram;" in Column 15, line 18; replace lines 34-53 with the following:
   --means, having an input coupled to said output of said first and second count arrays, for comparing said frequency stored in said first count array and said frequency stored in said second count array to obtain a distance update; and
   means, coupled to an output of said means for comparing, for adding said distance update to a current holographic distance to obtain an updated holographic distance.--

Signed and Sealed this

Thirtieth Day of July, 1996

BRUCE LEHMAN

Attest:

*Attesting Officer*     *Commissioner of Patents and Trademarks*